United States Patent
Mimura

(10) Patent No.: US 7,652,799 B2
(45) Date of Patent: Jan. 26, 2010

(54) IMAGE FORMING APPARATUS AND IMAGE FORMING METHOD

(75) Inventor: Toshifumi Mimura, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 526 days.

(21) Appl. No.: 11/252,611

(22) Filed: Oct. 19, 2005

(65) Prior Publication Data

US 2006/0082836 A1   Apr. 20, 2006

(30) Foreign Application Priority Data

Oct. 20, 2004 (JP) ............................. 2004-306163
Aug. 25, 2005 (JP) ............................. 2005-244357

(51) Int. Cl.
*H04N 1/40* (2006.01)
*G06K 9/00* (2006.01)

(52) U.S. Cl. .................. 358/448; 358/3.22; 382/167

(58) Field of Classification Search ................ 358/3.22, 358/448; 382/167
See application file for complete search history.

(56) References Cited

U.S. PATENT DOCUMENTS

| 5,605,777 | A | | 2/1997 | Ando et al. |
| 5,751,434 | A | * | 5/1998 | Narendranath et al. ........ 358/1.9 |
| 6,724,935 | B1 | * | 4/2004 | Sawada et al. ............... 382/167 |
| 6,798,544 | B1 | * | 9/2004 | Chiba et al. ................. 358/3.22 |

FOREIGN PATENT DOCUMENTS

| JP | 5-191607 A | 7/1993 |
| JP | 2764066 B2 | 4/1998 |

* cited by examiner

*Primary Examiner*—King Y Poon
*Assistant Examiner*—Javier Segura
(74) *Attorney, Agent, or Firm*—Foley & Lardner LLP

(57) ABSTRACT

When copying an object that has faded markings of color fadable toner and is printed with the color fadable toner, a threshold value changing key is displayed on a liquid crystal display of an operation panel to be pressed down. A main CPU sets a threshold value $1a$ and a threshold value $2a$ in an image processing unit upon detecting the threshold value changing key displayed on the liquid crystal display of the operation panel via a touch panel. The image processing unit eliminates a background image by using the set threshold value $1a$ and threshold value $2a$, thereby providing dark printing with an excellent image.

20 Claims, 10 Drawing Sheets

IMAGE FORMING APPARATUS AND IMAGE FORMING METHOD

CROSS-REFERENCE TO RELATED APPLICATIONS

This application is based upon and claims the benefit of priority from prior Japanese Patent Applications No. 2004-306163, filed Oct. 20, 2004; and No. 2005-244357, filed Aug. 25, 2005, the entire contents of both of which are incorporated herein by reference.

BACKGROUND OF THE INVENTION

1. Field of the Invention

The present invention relates to an image forming apparatus such as a copier, a printer, a facsimile machine, or a multifunction peripheral integrating copier, printer, and facsimile machine, and an image forming method.

2. Description of the Related Art

Conventionally, because of the development of environmental consciousness as seen in a movement for protection of forests as paper resources, printing on a non-printed surface of a paper, double sided printing, and printing on a recycled paper, have been popular so as to reduce the number of papers used for the image forming apparatus such as a copier, a printer, a facsimile machine, or a multifunction peripheral integrating the copier, printer, and facsimile machine.

Furthermore, there are known methods of recycling papers, i.e., a method of separating toner on the paper mechanically or chemically therefrom and a method of using toner which is color fadable as applying heat, light, or chemical (for example, U.S. Pat. No. 5,605,777 and Jpn. Pat. Appln. KOKAI Publication No. 5-191607).

Among the above-described methods of reducing the number of papers used for printing, the latter method of separating toner on the paper or using the toner which is color fadable has more effective paper saving effects than those of the former method of printing on the non-printed surface of the paper or double sided printing.

The above-described method of separating toner on the paper damages the paper by peeling the toner out from the paper, thereby lowering the durability of toner after printing on that paper, and furthermore, this method is not efficient because the toner has to be peeled from every page. Also, the method of using a chemical has a problem in a process of treating the chemical.

The method of using the toner which is color fadable is more effective than the method of separating toner on the paper. Although color of the toner can be erased, other components than coloring component remain thereon. For this reason, slight printed markings remain, and repeating the process of printing→erasing→printing→erasing gives numerous layers of markings which darken the surface. Further, in order to secure effective color fading function, image concentration is set to be lower than that when using general non-fadable toner.

Among the above two problems, when copying the paper with printing of the color fadable toner on which the toner was erased once or plural times prior to the printing, the background with the remaining markings is recognized as an "image" and is treated as an image after reading, and the actual printing on the reused paper generally is very light because of the lower concentration thereof, so that the actual printed portion is recognized as a light image print. Then, when the printed paper is copied, the image portion on the paper becomes light and the erased portions on the background of the paper appear on the copied paper, making the copy difficult to be read. Regarding the facsimile, a desired image cannot be transmitted because of the image in the case of copying described above, and in addition, a desired image cannot be obtained even with the scanner.

Especially, to improve these problems with the color fadable toner, operations such as adjusting the background of the paper and concentration, or changing the range corrected intensity when an image forming apparatus has an image process adjustment function.

However, plural steps are necessary to perform the operations, which makes it more complicated and requires to go through these steps every time when using a copying, faxing, or scanning function, thereby significantly decreasing the efficiency. Also, there is no means for obtaining a desirable image by using an image forming apparatus without an image process adjustment function which enables users to perform variable adjustment.

BRIEF SUMMARY OF THE INVENTION

An object of the invention is to provide an image forming apparatus and an image forming method using color fadable toner, which offers the effective image processing adjustment function.

According to an aspect of the present invention, there is provided an image forming apparatus comprising: reading means for reading an image on an object; image processing means for processing an image read by the reading means; storage means for storing in advance threshold information for use in the image processing of the image processing means; instructing means for instructing the threshold information for use in the image processing of the image processing means; and control means for, when the threshold information is instructed by the instructing means, controlling to read the instructed threshold information from the storage means and to set the information in the image processing means.

According to another aspect of the present invention, there is provided an image processing method comprising: reading an image on an object; processing the image read by the reading step; storing in advance threshold information for use in the image processing of the processing step; instructing the threshold information for use in the image processing of the processing step; and when threshold information is instructed, reading the instructed threshold information from the threshold information stored in advance and setting the information in the processing step.

Additional objects and advantages of as aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of an aspect of the invention.

FIG. 11 is a view showing an example of an image utilizing the threshold value 1a and the threshold value 2a;

DETAILED DESCRIPTION OF THE INVENTION

One embodiment of the invention will be explained next with reference to the accompanying drawings.

Figure 1:
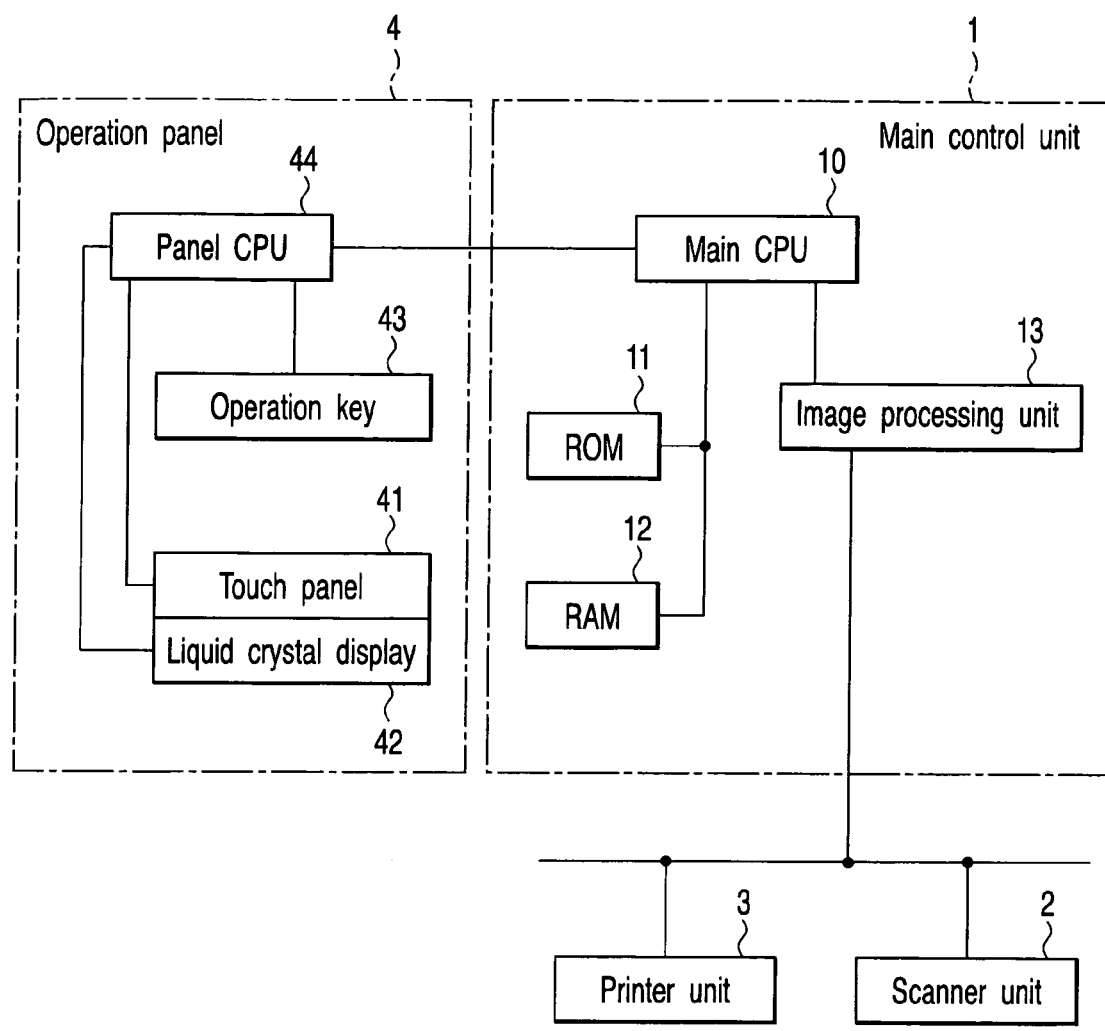
FIG. 1 is a block diagram showing a schematic configuration of an image forming apparatus according to one embodiment of the invention.

FIG. 1 is a block diagram showing a schematic configuration of a image forming apparatus according to one embodiment of the invention. The image forming apparatus comprises a main control unit 1, a scanner unit 2, a printer unit 3, and an operation panel 4.

The main control unit 1 has a main CPU 10 for governing the entire control of the apparatus, a ROM 11 in which a control program or the like is stored, a RAM 12 for temporarily storing data, and an image processing unit 13 (described later in detail) for processing an image by setting a concentration threshold value.

The scanner unit 2 is reading means for reading an image on an object (typically paper).

The printer unit 3 is image forming means for forming an image on the paper based on the image data processed at the image processing unit 13. For example, the printer unit 3 comprises a photoreceptor as an image carrier, a laser exposure device for forming an electrostatic latent image on the photoreceptor, a developing device for developing by supplying a toner as a photographic developer, and a transfer device for transferring the toner image to the paper.

The operation panel 4 has a liquid crystal display 42 having a touch panel 41, various operation keys 43, and a panel CPU 44 connected with the liquid crystal display 42 and the operation keys 43, and is connected to the main CPU 10.

Then, image reading operation in the case of using a color fadable toner in the image forming apparatus having such a configuration will be explained below.

First, in order to explain this embodiment, a conventional case will be explained.

Figure 2:
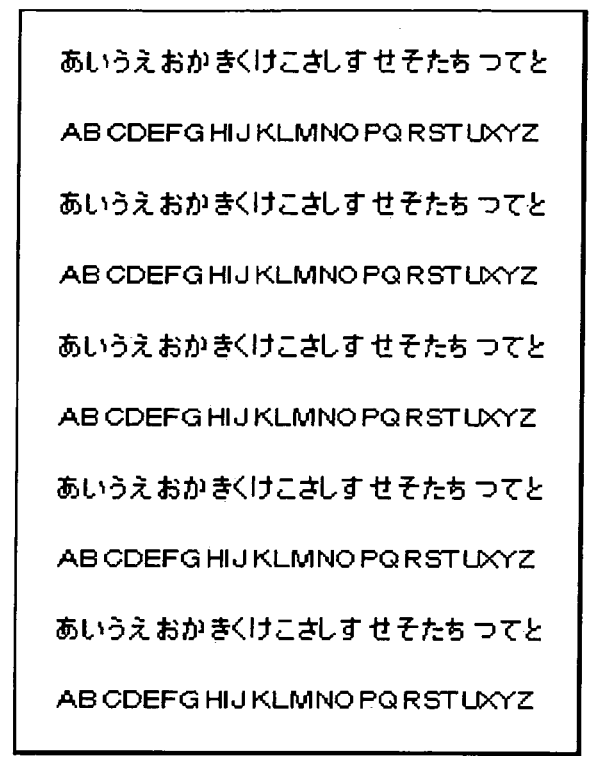
FIG. 2 is a view showing an example of an object printed with a conventional toner.

FIG. 2 is a view showing an example of an object printed with a conventional toner.

Figure 3:
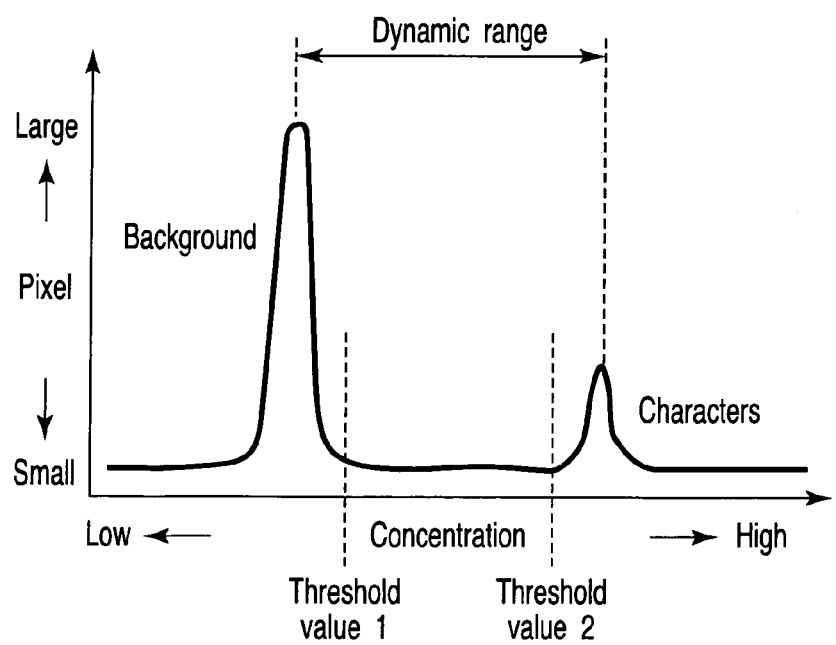
FIG. 3 is a graph illustrating concentration histogram data of the object in FIG. 2.

FIG. 3 is a graph illustrating concentration histogram data of the object in FIG. 2.

Figure 4:
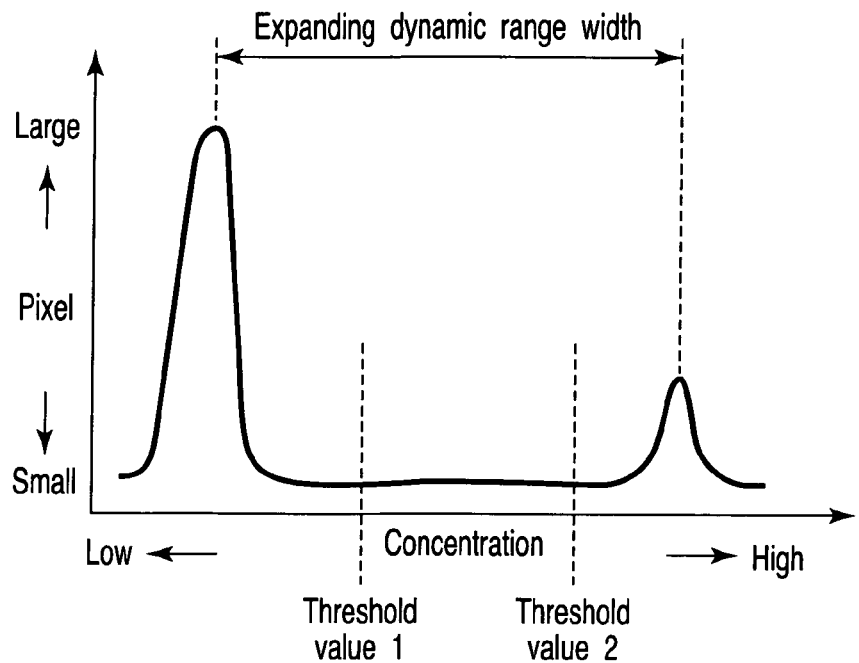
FIG. 4 is a graph illustrating the concentration histogram data after image processing for copying the object printed with the conventional toner.

FIG. 4 is a graph illustrating the concentration histogram data after image processing for copying the object printed with the conventional toner.

The dynamic range width between the lower concentration side and the higher concentration side of the concentration histogram data in FIG. 3, is expanded in the concentration histogram data in FIG. 4 (expansion of the dynamic range width). This is because the lower concentration side is set so that the image processing is performed as the concentration not higher than a certain threshold value is recognized as a white background surface in order to create better appearance even for an object with a certain degree of image concentration such as a newspaper (threshold value 1 in FIG. 4). In addition, at the higher concentration side, in order to increase the reproducibility and better appearance of an object written by a pencil, the image processing is performed so that the concentration not lower than a certain threshold value is darkened (threshold value 2 in FIG. 4). These image processing are called a range correction.

Also, an intermediate concentration between the threshold value 1 and the threshold value 2, the image processing is performed to make the concentration slightly higher than that of the object in order to improve the document reproducibility.

Figure 5:
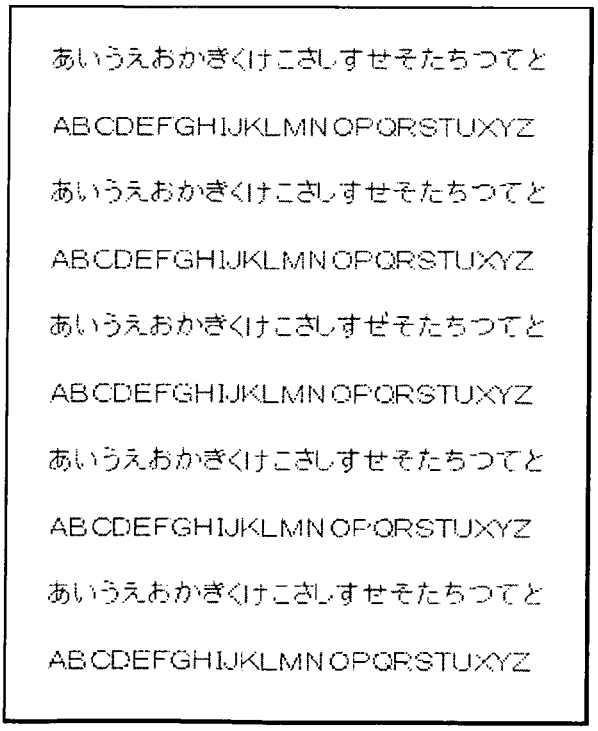
FIG. 5 is a view showing an example of an object printed with a color fadable toner.

On the other hand, FIG. 5 is a view showing an example of an object printed with a color fadable toner. Here, the image concentration is set to be rather lower relative to an image printed with a general toner in order to secure the fadability. Further, the color fadable toner with different color than a general black toner is often used so as to be distinguished easily from general printed materials.

Figure 6:
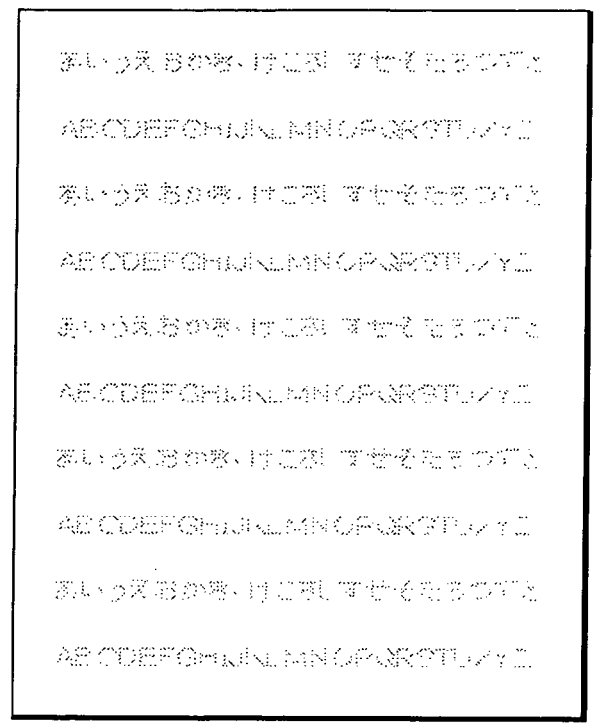
FIG. 6 is a view showing an image example after erasing the color of the image printed with the color fadable toner.

FIG. 6 is a view showing an example of an image of the image printed with the color fadable toner after color fading. As explained above, after color fading, coloring characteristic of the toner is extinguished but components of the toner remain on the paper. Therefore, slight printing markings may be seen depending on the viewing angle.

Figure 7:
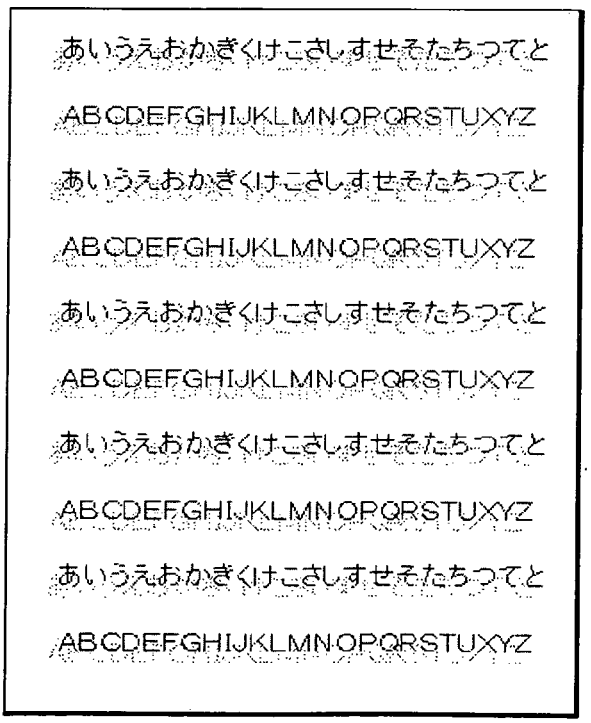
FIG. 7 is a view showing an example of an object printed with a color fadable toner over faded markings remained on the object paper after color fading.

If the paper on which the printing markings remain after color fading is printed with the color fadable toner, an image shown in FIG. 7 is obtained. As shown in FIG. 7, the image is such that the printing with the color fadable toner is performed on the background surface with slightly visible printing markings.

Figure 8:
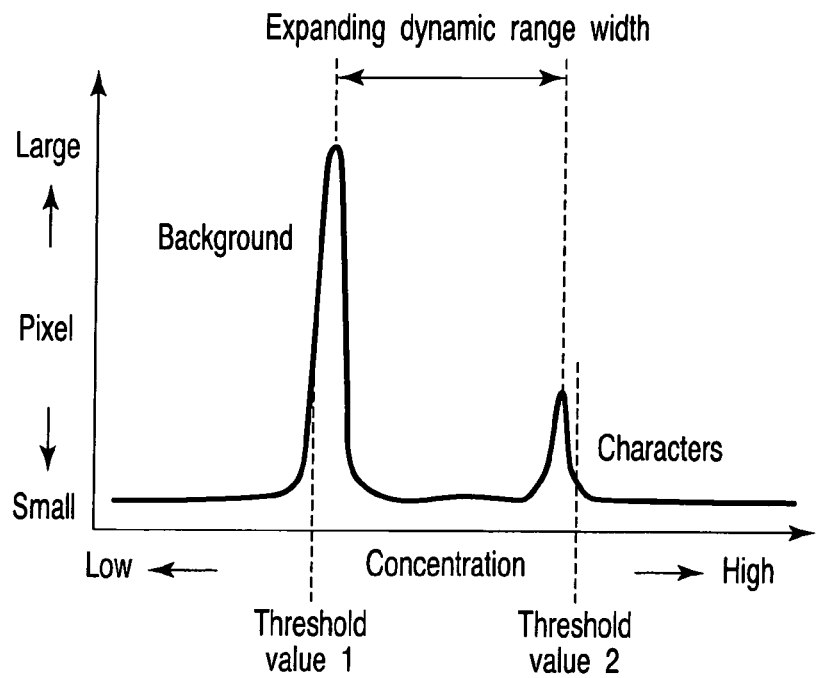
FIG. 8 is a graph illustrating concentration histogram data of the image in FIG. 7.

FIG. 8 is a graph illustrating concentration histogram data of the image in FIG. 7. At this time, there are printing markings remaining on the background surface of the paper, thereby having the concentration of the threshold value 1 or more, and the higher concentration side has light printing, thereby providing data having the threshold value 2 or less.

As such, if a general image processing is performed utilizing the image shown in FIG. 7 having the concentration histogram data of FIG. 8, the result would be as explained below.

Figure 9:
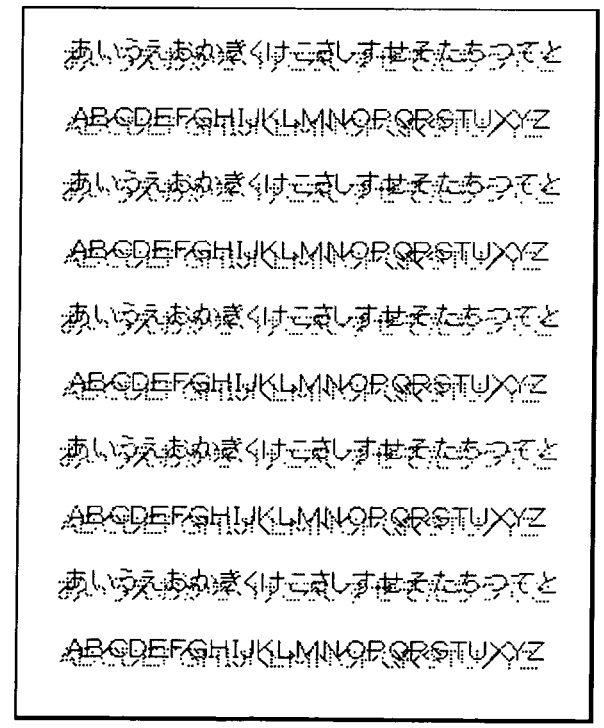
FIG. 9 is a view showing the result of image processing of the image in FIG. 7.

FIG. 9 is a view showing the result of the image processing described above. As shown in FIG. 9, not only characters but also the faded background surface markings can be recognized for printing, which makes the image difficult to be viewed. Also, the character printing becomes light, which is not subject to the above-described range correction giving no further dark printing, and therefore mixing with the printed background surface, this further makes the image difficult to be viewed.

Here, the embodiment of the present invention is designed to eliminate the problems arise when the object obtained such that the paper with the faded markings of the color fadable toner is printed with the color fadable toner is either copied, scanned, faxed, etc. That is, when using the object obtained such that the paper with the faded markings of the color fadable toner is printed with the color fadable toner, the embodiment of this invention is designed to switch one or more image processings varied from the above-described threshold value 1 and threshold value 2 of the image processing in order to obtain a desired excellent image.

More specifically, with respect to the object obtained such that the paper with the faded markings of the color fadable toner is printed with the color fadable toner, a threshold value 1*a* and a threshold value 2*a* different from the above-described threshold value 1 and threshold value 2 are prepared for switching.

Figure 10:
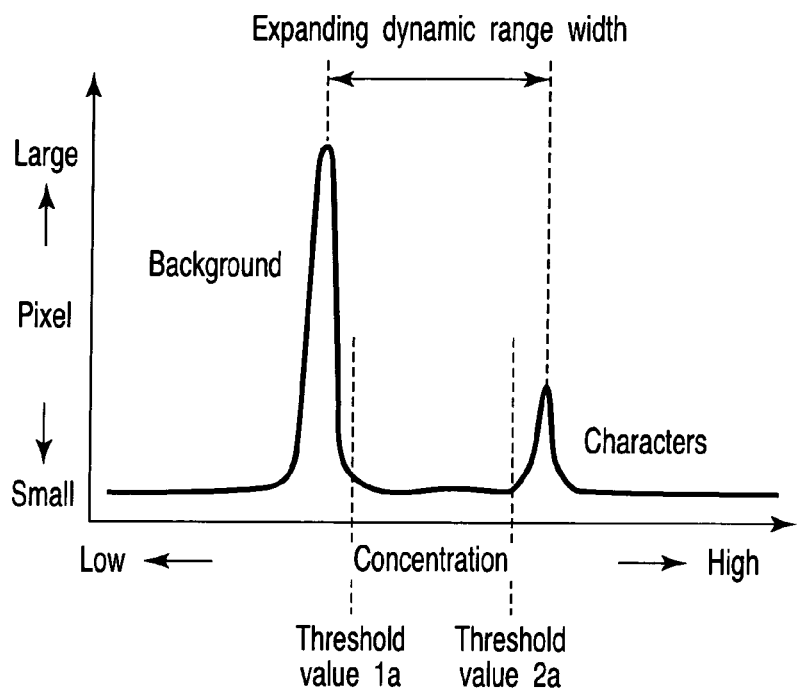
FIG. 10 is a graph illustrating an example of setting of a threshold value 1a and a threshold value 2a different from the threshold value 1 and the threshold value 2.

FIG. 10 is a graph illustrating an example of setting of the threshold value 1*a* and the threshold value 2*a*.

In this embodiment, a threshold value changing key (not shown) is shown in the liquid crystal display 42 of the operation panel 4.

When copying the object obtained such that the paper with the faded markings of the color fadable toner is printed with the color fadable toner, the threshold value changing key (not shown) is shown on the liquid crystal display 42 of the operation panel 4 and is pushed down.

When detecting the threshold value changing key (not shown) displayed on the liquid crystal display 42 of the operation panel 4 through the touch panel 41, the main CPU 10 sets the threshold value 1*a* and the threshold value 2*a* in the image processing unit 3.

The image processing unit 13 eliminates the background surface as shown in FIG. 1 by using the set the threshold value 1*a* and threshold value 2*a*, thereby obtaining the printing with the darker excellent image.

Also, as repeating of printing, erasing, printing, erasing, etc., layers of markings remaining after fading gradually become darker. Therefore, levels of the threshold value 1 and the threshold value 2, each needs to be changed, and after the second erasure, a threshold value 1*b* and a threshold value 2*b* are set in the higher concentration side than the threshold value 1 and the threshold value 2. In the same manner, threshold values 1*c* and 2*c*, threshold values 1*d* and 2*d*, and so on should be stored in advance in nonvolatile storage (not shown).

For example, the main CPU 10 displays selection keys after the first erasure, the second erasure, the third erasure, and the fourth erasure on the liquid crystal display 42.

In addition, the threshold value changing key (not shown) is set in the operation key 43. The main CPU 10 changes the settings of the threshold values by setting the threshold values 1*a* and 2*a* by one press, setting the threshold values 1*b* and 2*b* by the second press, setting the threshold values 1*c* and 2*c* by the third press, and so on.

Because of this configuration, this embodiment can provide an excellent image on an appropriate background surface according to the number of erasing processes.

Note that the above-described switching of the image processing is not limited to copying but may have the threshold value which is optimized for scanning and faxing respectively.

Furthermore, the threshold value may be adjusted without any level.

Now, modifications of the above-described embodiment will be explained.

Figure 12:
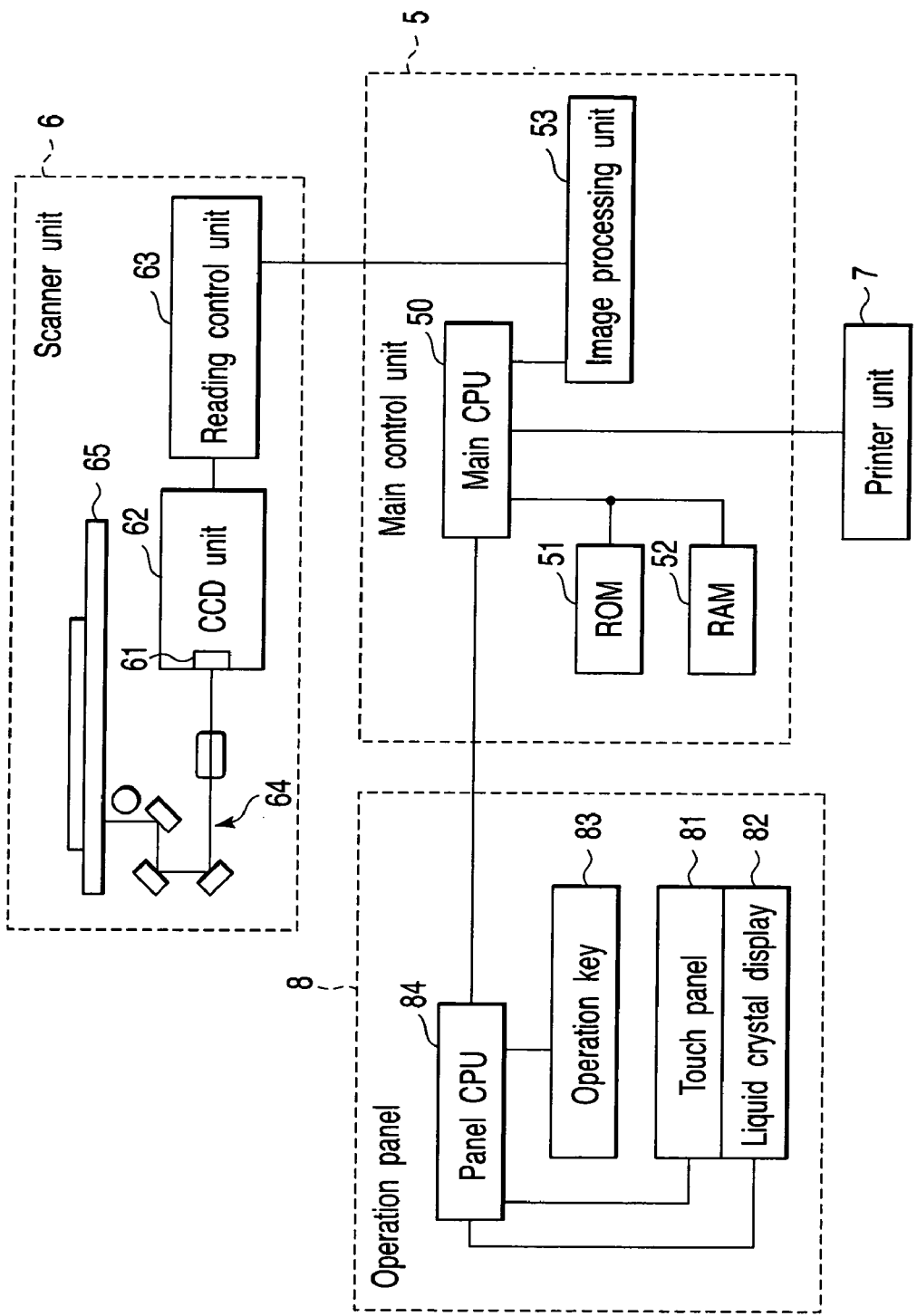
FIG. 12 is a block diagram showing a schematic configuration of a color image forming apparatus relating to a modification of this invention.

FIG. 12 shows a schematic configuration of a color image forming apparatus according to one modification of the invention. The color image forming apparatus comprises a main control unit 5, a scanner unit 6, a printer unit 7 and an operation panel 8.

The main control unit 5 comprises a main CPU 50 for governing the entire control of the apparatus, a ROM 51 in which a control program or the like is stored, a RAM 52 for temporarily storing data, and an image processing unit 53 (described later in detail) for processing an image.

The scanner unit 6 has a CCD unit 62 having a full color CCD 61, a reading control unit 63, an optical mechanism unit 64, and a platen glass 65 on which an object is placed. Here, a 4-line color CCD may be employed as the full color CCD 61.

The printer unit 7 is image forming means for forming an image on a paper based on image data.

The operation panel 8 has a liquid crystal display 82 having a touch panel 81, various operation keys 83, and a panel CPU 84 connected with the liquid crystal display 82 and the operation keys 83, and is connected to a main CPU 10.

Then, image reading operation using a color fadable toner in the image forming apparatus having such a configuration will be explained next.

The modification is designed to eliminate the problem arises when the object obtained such that the paper with the faded markings of the color fadable toner is printed with the color fadable toner is either copied, scanned, faxed, etc. Therefore, when using the object obtained such that the paper with the faded markings of the color fadable toner is printed with the color fadable toner, the modification is designed to switch one or more image processings varied from the above-described threshold value 1 and threshold value 2 of the image processing in order to obtain a desired excellent image.

More specifically, color of the printed color fadable toner (blue in this example) is stored in advance in the main control unit 5 of the image forming apparatus. Then, when the full color CCD 61 of the scanner unit 6 reads the object on the platen glass 65, the reading control unit 63 identifies whether or not there is any blue on the object.

If the reading control unit 63 identifies that there is blue, the image processing unit 53 switches to the image processing for the above-mentioned color fadable toner object.

Here, the condition of identification is to avoid misidentification of the color object other than the color fadable toner (blue) so as to improve accuracy of identification. However, a general color object is rarely formed with one color. Accordingly, the reading control unit 63 reduces a chance of misidentification by identifying whether or not the image portion on the object only has the color fadable toner (blue) stored in advance in the main control unit 5 of the image forming apparatus.

Also, as repeating of printing, erasing, printing, erasing, etc., layers of markings remaining after color fading gradually become darker. By adding, to the previously described condition that there is the color of the color fadable toner stored in advance, another condition of identification that the background surface other than the printed image portion such as characters is dark because of the faded markings left on the background surface after color fading, it becomes possible to identify more accurately the image with numerously faded color fadable toner markings.

Figure 11:
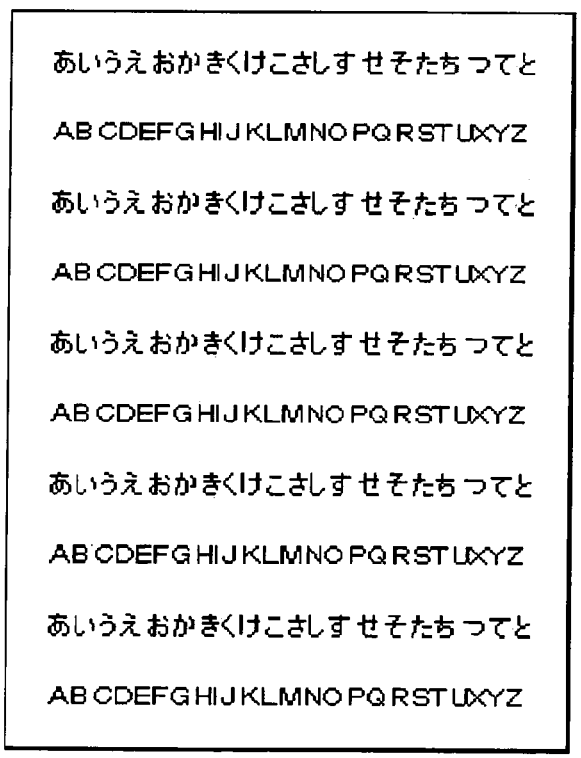

For example, the main CPU 50 of the image forming apparatus stores the threshold value 1*a* and the threshold value 1*b* as shown in FIG. 10 relative to the object obtained such that the paper with the faded markings of the color fadable toner is printed with the color fadable toner. When the user copies the object obtained such that the paper with the faded markings of the color fadable toner is printed with the color fadable toner, the main CPU 50 of the image forming apparatus switches the threshold values 1a and 1b to the image processing unit 53 by switching means (for example, operation on the operation panel 8), thereby providing dark printing with excellent image as shown in FIG. 11.

Figure 13:
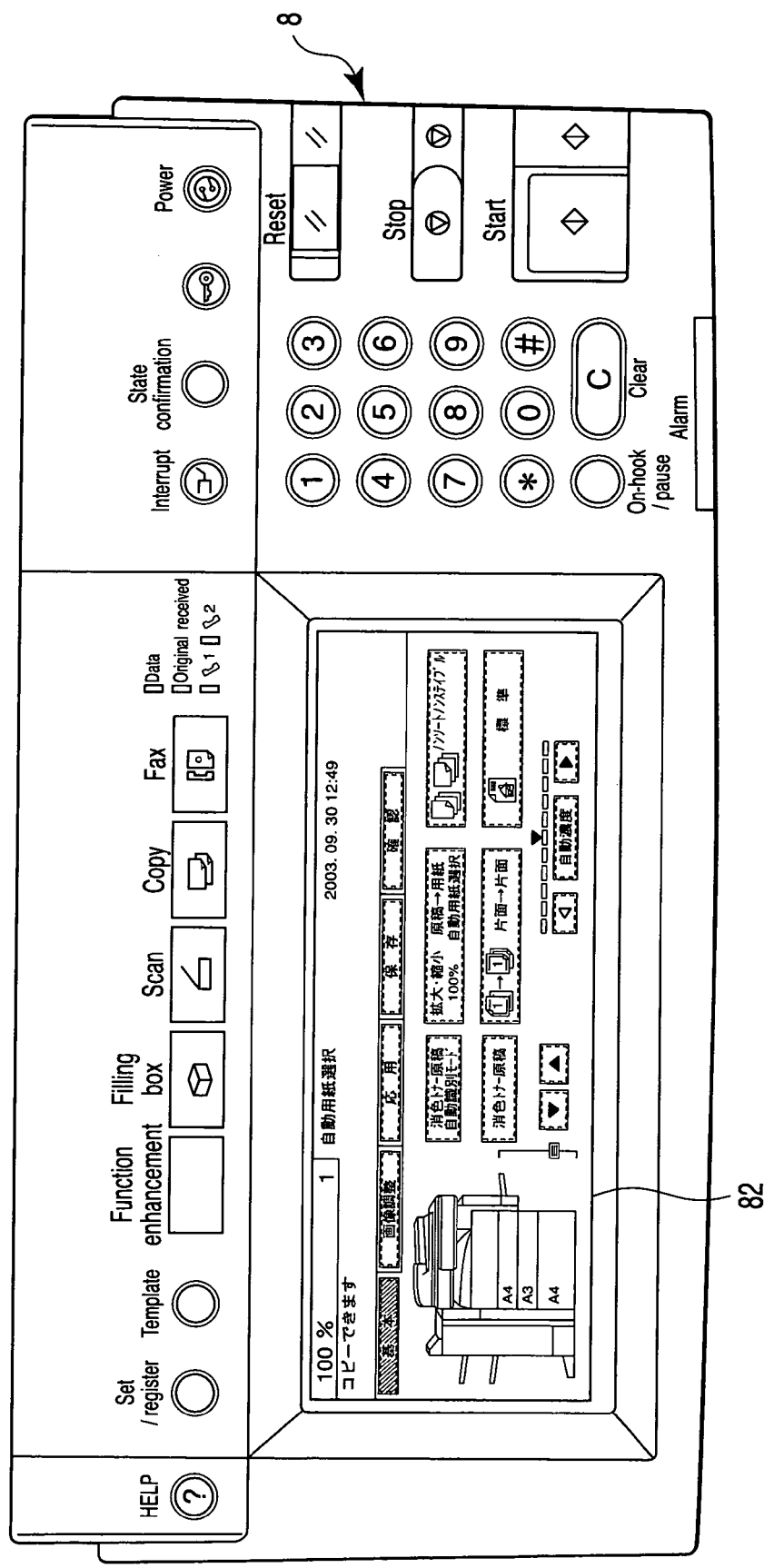
FIG. 13 is a view showing an example of a configuration of a control panel.

This modification uses a liquid crystal display 82 of the operation panel 8 as shown in FIG. 13.

Figure 14:
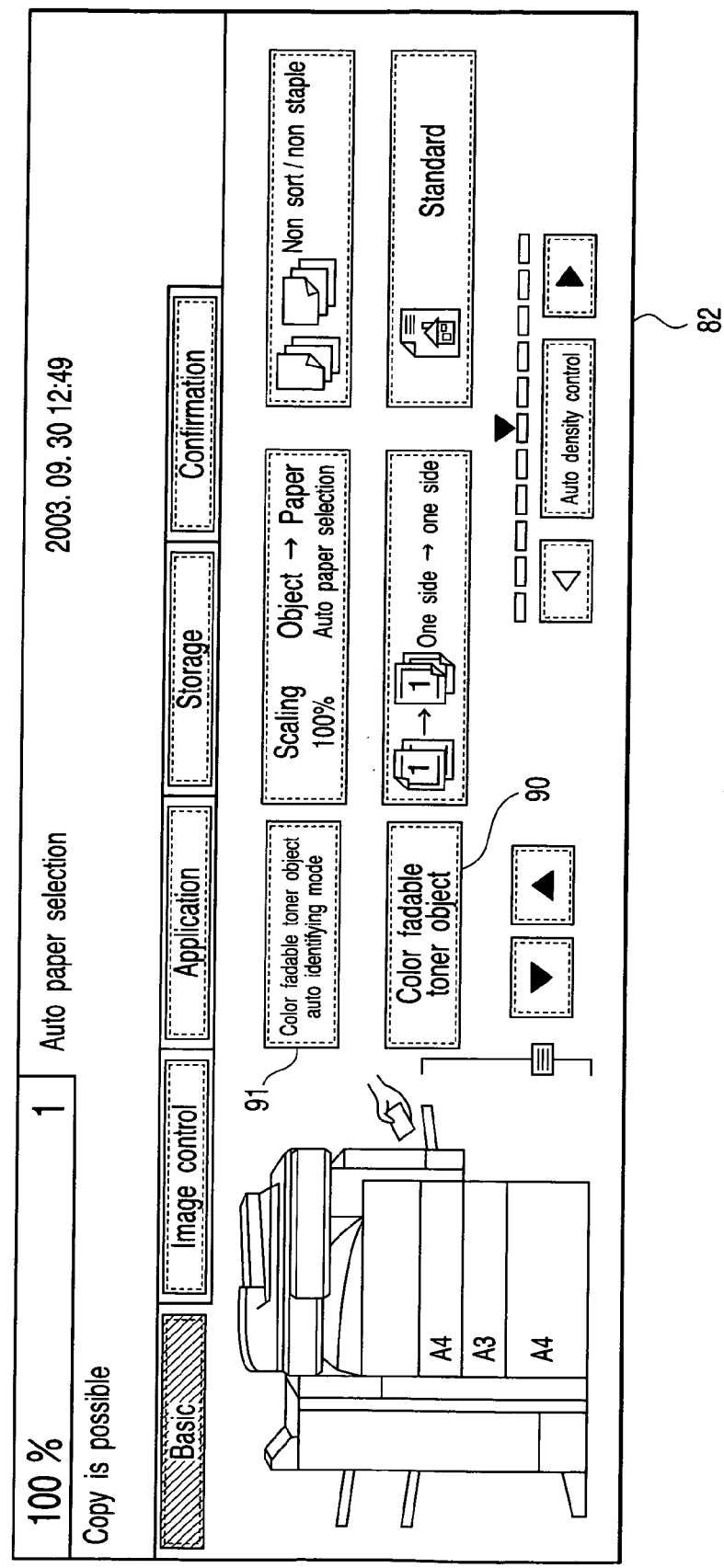
FIG. 14 is a view showing an example of display of a liquid crystal display unit.

FIG. 14 shows an example of display of the liquid crystal display 82, and a color fadable toner object key 90 is shown as a threshold (image processing) changing key.

When copying the object obtained such that the paper with the faded markings of the color fadable toner is printed with the color fadable toner, the color fadable toner object key 90 displayed on the liquid crystal display 82 of the operation panel 8 is pressed down. Then, the main CPU 50 switches the image processing unit 53 to the threshold value 1a and the threshold value 1b.

Also, as repeating of printing, erasing, printing, erasing, and so on, the layers of markings remaining after numerous color fading gradually become darker. Therefore, levels of the threshold value 1 need to be changed accordingly.

As above, this modification performs an automatic identification based on the color of the color fadable toner and the like. However, an automatic color fadable toner object identification mode key 91 allows to turn such a function on or off.

Figure 15:
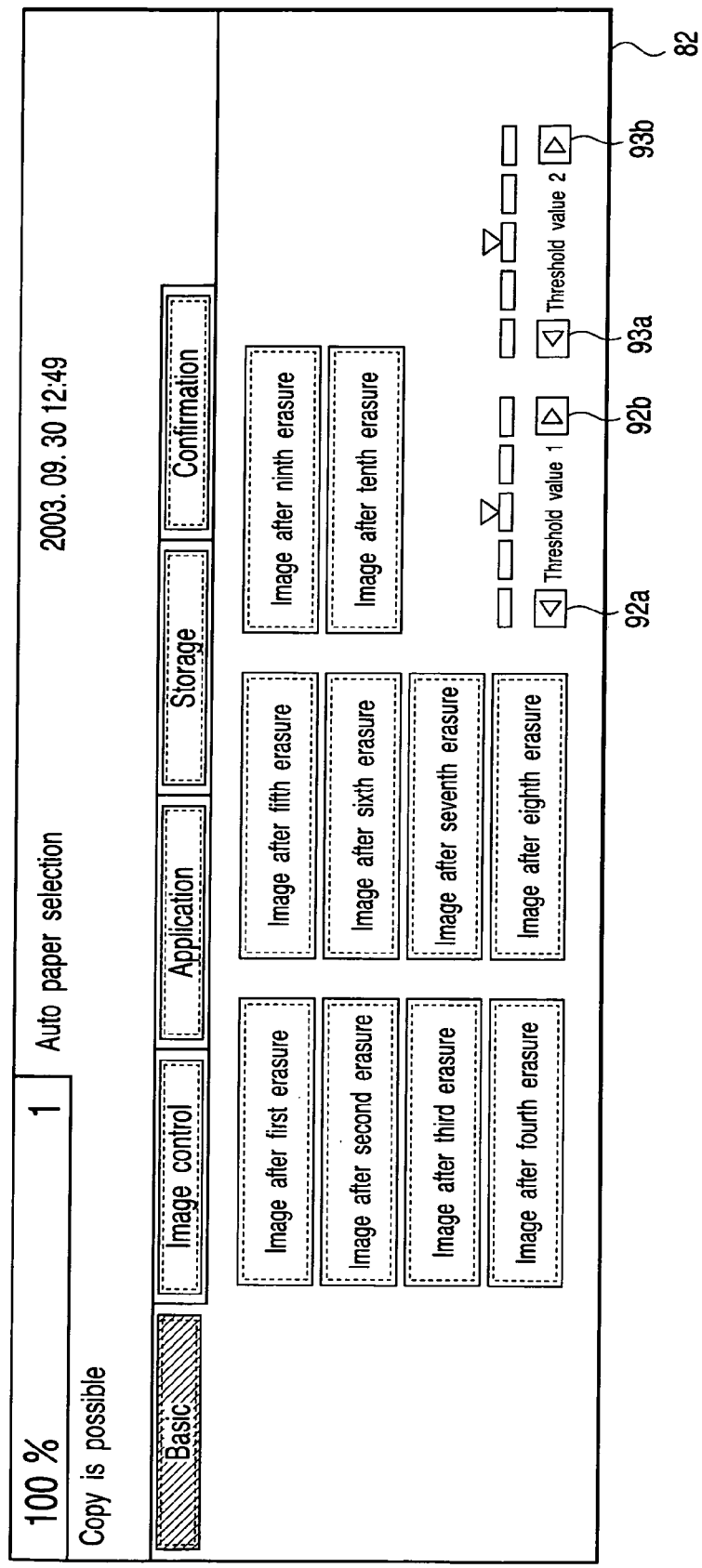
FIG. 15 is a view showing another example of the display of the liquid crystal display unit.

FIG. 15 shows an example of display of the liquid crystal display 82 so as to sequentially set the threshold value 1 according to the number of color fading. As shown in FIG. 15, the threshold value 1 may be sequentially set in the higher concentration side such as the object key after the first erasure, the object key after the second erasure, the object key after the third erasure, and so on. The main CPU 50 changes the settings of the threshold value 1 set in the image processing unit 53 according to keys of the number of color fading.

If the value of the threshold value 1 can be switched, it is possible to obtain an excellent image on appropriate background surface of the object according to the number of color fading. The above-described switching of the image processing is not limited to copying but may have a threshold value which is optimized for scanning and faxing respectively.

Furthermore, the threshold value may be adjusted without any level.

Also, as shown in FIG. 15, keys 92a, 92b, 93a, and 93b may be provided to arbitrary set the threshold values 1 and 2.

According to the embodiments of the invention explained above, even when copying, faxing or scanning the object with the remaining faded marking (printed markings) of the color fadable toner on the background surface, the object having the lower image concentration, the problems of printing the faded markings on the background surface and light printing are eliminated, thereby obtaining excellent high quality image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming device, comprising:
    a setting unit configured to set a first threshold value, a second threshold value, a third threshold value, and a fourth threshold value;
    a storage unit configured to store the first threshold value, the second threshold value, the third threshold value, and the fourth threshold value, wherein the first threshold value and the second threshold value are used for processing one or more objects without color faded markings from color fadable toner, wherein the third threshold value and the fourth threshold value are used for processing one or more objects with color faded markings from color fadable toner;
    a reading unit configured to read an image on the one or more objects;
    an image processing unit configured to process one or more images read by the reading unit;
    a control unit configured to read threshold information stored in the storage unit and set a threshold setting in the image processing unit; and
    an operational panel,
        wherein the control unit is configured to detect a selection of a first threshold value changing key on the operational panel and change the threshold setting of the image processing unit from the first threshold value and the second threshold value to the third threshold value and the fourth threshold value; and
        wherein the image processing unit is configured to process one or more images with the threshold setting set at the third threshold value and the fourth threshold value.

2. The image forming device of claim 1, wherein the reading unit comprises a color charge-coupled device (CCD) sensor.

3. The image forming device of claim 1, wherein the setting unit is further configured to set a fifth threshold value and a sixth threshold value,
    wherein the storage unit is configured to store the fifth threshold value and the sixth threshold value, wherein the fifth threshold value and the sixth threshold value are used for processing one or more objects with color faded markings from color fadable toner;
    wherein the control unit is configured to detect a selection of a second threshold value changing key on the operational panel and change the threshold setting of the image processing unit from the first threshold value and the second threshold value to the fifth threshold value and the sixth threshold value, or change the threshold setting of the image processing unit from the third threshold value and the fourth threshold value to the fifth threshold value and the sixth threshold value;
    wherein the image processing unit is configured to process one or more images with the threshold setting set at the fifth threshold value and the sixth threshold value.

4. The image forming device of claim 3, wherein the second threshold value changing key is associated with processing one or more objects that have been printed twice with color fadable toner.

5. The image forming device of claim 1, wherein the first threshold value changing key is associated with processing one or more objects that have been printed once with color fadable toner.

6. An image forming device, comprising:
    setting means for setting a first threshold value, a second threshold value, a third threshold value, and a fourth threshold value;
    storage means for storing the first threshold value, the second threshold value, the third threshold value, and the fourth threshold value, wherein the first threshold value and the second threshold value are used for processing one or more objects without color faded markings from color fadable toner, wherein the third threshold value and the fourth threshold value are used for processing one or more objects with color faded markings from color fadable toner;

reading means for reading images on the one or more objects;

image processing means for processing one or more images read by the reading unit;

control means for reading threshold information stored in the storage unit and setting a threshold setting in the image processing unit; and operational means for providing operational capabilities,
wherein the control means is configured to detect a selection of a first threshold value changing key on the operational means and change the threshold setting of the image processing means from the first threshold value and the second threshold value to the third threshold value and the fourth threshold value; and wherein the image processing means is configured to process one or more images with the threshold setting set at the third threshold value and the fourth threshold value.

7. The image forming device of claim 6, wherein the reading means comprises a color charge-coupled device (CCD) sensor.

8. The image forming device of claim 6, wherein the setting means is further configured to set a fifth threshold value and a sixth threshold value, wherein the storage means is configured to store the fifth threshold value and the sixth threshold value, wherein the fifth threshold value and the sixth threshold value are used for processing one or more objects with color faded markings from color fadable toner;

wherein the control means is configured to detect a selection of a second threshold value changing key on the operational means and change the threshold setting of the image processing means from the first threshold value and the second threshold value to the fifth threshold value and the sixth threshold value, or change the threshold setting of the image processing means from the third threshold value and the fourth threshold value to the fifth threshold value and the sixth threshold value;

wherein the image processing means is configured to process one or more images with the threshold setting set at the fifth threshold value and the sixth threshold value.

9. The image forming device of claim 8, wherein the second threshold value changing key is associated with processing one or more objects that have been printed twice with color fadable toner.

10. The image forming device of claim 6, wherein the first threshold value changing key is associated with processing one or more objects that have been printed once with color fadable toner.

11. A method, comprising:

setting a first threshold value, a second threshold value, a third threshold value, and a fourth threshold value;

storing the first threshold value, the second threshold value, the third threshold value, and the fourth threshold value, wherein the first threshold value and the second threshold value are used for processing one or more objects without color faded markings from color fadable toner, wherein the third threshold value and the fourth threshold value are used for processing one or more objects with color faded markings from color fadable toner;

reading an image on the one or more objects;

detecting a selection of a first threshold value changing key on an operational panel and changing a threshold setting of an image processing unit from the first threshold value and the second threshold value to the third threshold value and the fourth threshold value; and processing one or more images with the threshold setting set at the third threshold value and the fourth threshold value.

12. The method of claim 11, further comprising:

setting a fifth threshold value and a sixth threshold value;

storing the fifth threshold value and the sixth threshold value, wherein the fifth threshold value and the sixth threshold value are used for processing one or more objects with color faded markings from color fadable toner;

detecting a selection of a second threshold value changing key on the operational panel and changing the threshold setting of the image processing unit from the first threshold value and the second threshold value to the fifth threshold value and the sixth threshold value, or changing the threshold setting of the image processing unit from the third threshold value and the fourth threshold value to the fifth threshold value and the sixth threshold value;

processing one or more images with the threshold setting set at the fifth threshold value and the sixth threshold value.

13. The method of claim 12, wherein the second threshold value changing key is associated with processing one or more objects that have been printed twice with color fadable toner.

14. The method of claim 11, wherein the first threshold value changing key is associated with processing one or more objects that have been printed once with color fadable toner.

15. An image forming device, comprising:

a setting unit configured to set a first threshold value, a second threshold value, a third threshold value, and a fourth threshold value;

a storage unit configured to store the first threshold value, the second threshold value, the third threshold value, and the fourth threshold value, wherein the first threshold value and the second threshold value are used for processing one or more objects without color faded markings from color fadable toner, wherein the third threshold value and the fourth threshold value are used for processing one or more objects with color faded markings from color fadable toner;

a reading unit configured to read an image on an object;

an image processing unit configured to process the image read by the reading unit; and a control unit configured to read threshold information stored in the storage unit and set a threshold setting in the image processing unit, wherein the reading unit comprises a sensor configured to determine if the object is printed with color fadable toner;

wherein the control unit is configured to change the threshold setting of the image processing unit from the first threshold value and the second threshold value to the third threshold value and the fourth threshold value when it is determined that the object is printed with color fadable toner; and wherein the image processing unit is configured to process the image with the threshold setting set at the third threshold value and the fourth threshold value.

16. The image forming device of claim 15, wherein the sensor is a color charge-coupled device (CCD) sensor.

17. The image forming device of claim 15, wherein the sensor is configured to determine if the object is printed with color fadable toner by identifying whether or not an image portion of the object is comprised only of a color of the color fadable toner.

18. A method, comprising:
- setting a first threshold value, a second threshold value, a third threshold value, and a fourth threshold value;
- storing the first threshold value, the second threshold value, the third threshold value, and the fourth threshold value, wherein the first threshold value and the second threshold value are used for processing one or more objects without color faded markings from color fadable toner, wherein the third threshold value and the fourth threshold value are used for processing one or more objects with color faded markings from color fadable toner;
- reading an image on an object;
- determining if the object is printed with color fadable toner;
- changing a threshold setting of an image processing unit from the first threshold value and the second threshold value to the third threshold value and the fourth threshold value when it is determined that the object is printed with color fadable toner; and
- processing unit is configured to process the image with the threshold setting set at the third threshold value and the fourth threshold value.

19. The method of claim 18, wherein the sensor is a color charge-coupled device (CCD) sensor.

20. The method of claim 18, determining if the object is printed with color fadable toner comprises identifying whether or not an image portion of the object is comprised only of a color of the color fadable toner.

* * * * *